March 12, 1968 S. B. RONDUM 3,373,233
METHOD OF MOLDING COUNTERTOPS
Filed March 30, 1964 2 Sheets-Sheet 1

INVENTOR.
SVEND B. RONDUM

March 12, 1968  S. B. RONDUM  3,373,233
METHOD OF MOLDING COUNTERTOPS
Filed March 30, 1964   2 Sheets-Sheet 2

INVENTOR.
SVEND B. RONDUM

United States Patent Office 3,373,233
Patented Mar. 12, 1968

3,373,233
METHOD OF MOLDING COUNTERTOPS
Svend B. Rondum, Bradford, Pa., assignor to Plexowood, Inc., Bradford, Pa., a corporation of Pennsylvania
Filed Mar. 30, 1964, Ser. No. 355,669
7 Claims. (Cl. 264—25)

The present invention relates to a method of molding countertops and is concerned primarily with certain improvements in a known method resulting in practical advantages.

A countertop of the type with which this invention is concerned comprises a flat horizontal portion constituting the work surface and a rear vertical flange commonly known as a backsplash. Each consists of a composite body of wood chips and a resin with a laminated plastic overlay covering the exposed face. The overlay for both the working surface and backsplash is an integral one-piece affair which eliminates any cracks or crevices at the corner in which dirt or food particles might lodge and to facilitate cleaning.

In the co-pending application of Svend B. Rondum, Ser. No. 252,132, filed: Jan. 17, 1963, and entitled "Laminated Countertop and Method of Producing the Same," there is disclosed a method of molding countertops and which method is characterized by the fact that the horizontal work surface and backsplash are initially molded in a common plane and joined by a metallic strip having a flange embedded in each of these elements. After the molding of these elements from wood chips and resin, the metallic strip is bent to achieve the right angular relation of the backsplash and working surface.

In accordance with the method of said application, the laminated plastic overlay is preformed to provide portions for covering the working surface, the backsplash, and the curved corner of the metallic strip. After being so preformed, it is applied to the composite structure by using an adhesive and pressure.

The primary object of the present invention is to provide a method of molding countertops in which the laminated plastic overlay is molded with the composite body of wood chips and resin. The overlay is partly cured by the heat of the molding operation and that portion which overlies the metallic connecting strip is in a condition to be bent immediately after removal from the mold. In the event the countertops are stored flat that portion of the overlay which covers the connecting strip may be conditioned for bending by heating it at a time immediately prior to the forming operation.

In order that the bending and forming of the overlay at the corner be effectively carried out, it is important that the overlay be not bonded to the metallic connecting strip. This provides for relative movement between the two during the bending operation. Thus, another important object of the present invention is to provide in a method of the character aforesaid, the step of masking the exposed surface of the metallic connecting strip from the overlay. This masking may be achieved either mechanically such as by interposing a strip of kraft paper between the metallic strip and the overlay or chemically by the use of a chemical release agent.

The laminated plastic overlay of the type with which this invention is concerned is now fairly well standardized in the industry and one such overlay is commonly sold under the trademark "Formica." Such an overlay consists essentially of one or more backing sheets which may be of kraft paper, a printed sheet on which is displayed the decorative design and a top sheet of alpha cellulose. In accordance with the present invention, these various sheets are positioned in the mold above the mixture of wood chips and resin and the molding operation not only partly cures the overlay but bonds it to the composite body.

During use, the working surface of a countertop is subject to more wear than is the backsplash. Thus, it is not necessary that the overlay for the backsplash be as thick as that for the working surface. With this thought in mind a further object of the invention is to provide in a method of the type indicated the step of covering the composite body of the working surface with a plurality of backing sheets while the composite body of the backsplash is covered with only a single backing sheet with the metallic connecting strip being masked.

Various other more detailed objectives and advantages of the invention such as arise in connection with carrying out the above noted ideas in a practical embodiment and will in part become apparent and in part be hereinafter stated as a description of the invention proceeds.

The invention therefore comprises a method of forming countertops in which the plastic laminated overlay is molded with the composite bodies of wood chips and resin and bonded thereto with the metallic connecting strip between the bodies masked from the overlay and in which the overlay is either partly cured by the molding operation to permit bending immediately upon removal from the mold or is later heated to restore it to a bendable condition.

For a full and more complete understanding of the invention, reference may be had to the following description and accompanying drawings wherein.

Figure 6:
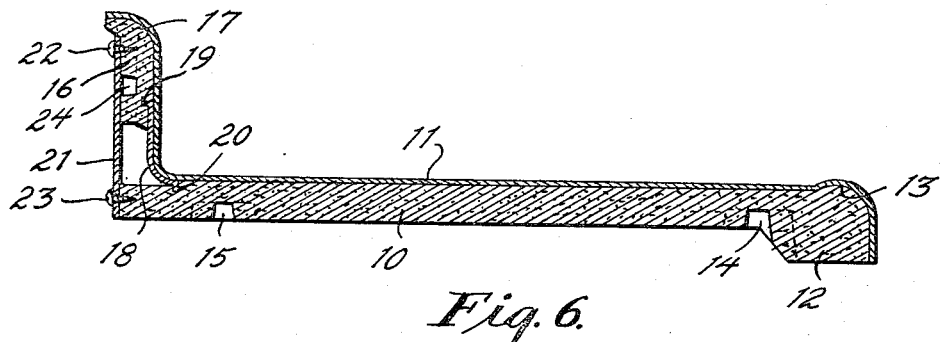
FIGURE 6 is a section through the finished product.

It is believed that the method of the present invention is best explained by first describing the structure of a complete countertop unit. Such a unit is shown in FIGURE 6 and includes a horizontal part providing a working surface and comprising a body 10. The composite body 10 is made of wood chips and resin as will later be described. It has a thickened front flange 12, the upper corner of which takes the form of a rounded bead 13. Entering into the body from the underface are channels 14 and 15 which constitute means for joining one unit to a next adjacent unit or other elements of the kitchen workpiece in which the countertop is included.

A complete unit also includes a vertical flange or backsplash 16 made of the same composite material having an exposed front face. This exposed face and the exposed top face of the body 10 are covered by an overlay 11. The back flange 16 has an upper rounded corner at 17 which is also covered by the overlay.

A metallic connecting strip 18 which may be made of any appropriate metal that is susceptible of bending such as aluminum joins the body 10 and backsplash 16. This strip 18 has a flange 19 that is embedded in the backsplash 16 and another flange 20 that is embedded in the body 10. A rigid bracing strip has its ends secured to the body 10 and backsplash 16 respectively. A screw shown at 22 secures one end of the brace 21 to the backsplash 16 and a second screw 23 secures the strip 21 to the body 10. The strip 21 may be of any appropriate material having the required property of rigidity such as steel.

The backsplash 16 also has a channel 24 formed on its rear face and this channel performs the same function as the channels 14 and 15.

The composite body

The horizontal body 10 and back piece 16 are composite bodies which are formed by compressing under heat an appropriate mixture of wood chips and a resin. The term "chips" as here employed is intended to embrace sawdust, flakes, splinters, shavings, and chips. Wood in one of these shapes will be present in the final product in a proportion ranging from 75% to 97% by weight.

The resin may be any of the following: Amino-phenolic, polyester, expoxy, phenolic, melamine-urea, urea formaldahyde, or any of the resins that naturally occur in wood such as lignin. Amino-phenolic is indicated as one of the preferred resins and the resin is present in the finished product in a proportion ranging from 3% to 25% by weight.

If desired, certain other materials may be added to the mixture such as waxy substances and zinc-stearate. These are employed as water proofing agents.

The mixture of resin and wood chips should be introduced into a press, the operating portion of which has a temperature ranging from 275° F. to 450° F. with the preferred temperature being about 300° F.

The press will have an operating pressure from 600 p.s.i. to 6,000 p.s.i. The particular pressure employed will depend upon the desired density in the finished product. This density may range from 25 pounds per cubic foot to 70 pounds per cubic foot.

Figure 3:
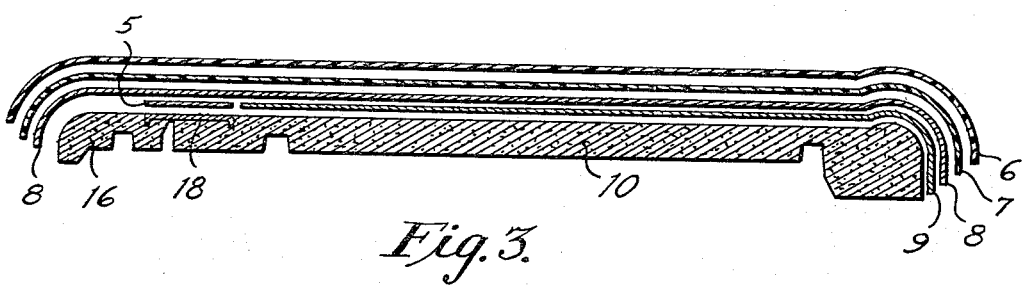
FIGURE 3 is a transverse section through the composite body and connecting strip with the several laminae of the overlay depicted in an exaggerated spaced condition.

Referring now more particularly to FIGURE 3, the laminated plastic overaly is shown as including a pair of back sheets 9 and 8. These backing sheets are ordinarily of a resin impregnated paper such as kraft paper and is notable that the sheet 9 extends only across the upper face of the composite body 10 while the sheet 8 extends over the body 10, connecting strip 18, and backsplash 16. Immediately over the backing sheets, there is a printed sheet 7 which may be of a post forming grade of melamine resin. This sheet 7 carries a decorative design which the overlay is intended to display. The printed sheet 7 is covered by a resin impregnated sheet 6 of alpha cellulose. It is also notable that the exposed face of the connecting strip 18 is masked by being covered with a strip 5 of masking material such as kraft paper.

Figure 1:
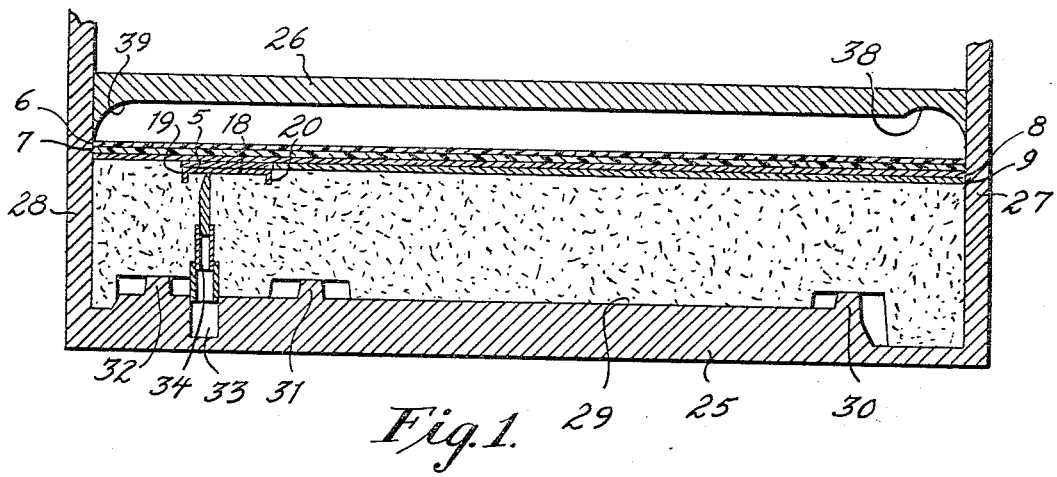
FIGURE 1 is a transverse section through a portion of a mold immediately after loading.

As shown in FIGURE 1, the press which is employed to carry out the molding method of this invention includes a female mold part 25 and a male mold part 26. The female mold part 25 has side walls 27 and 28, between which the male mold part 26 accurately fits in sliding relation. Upstanding from the inner or top face 29 of the female mold 25 are ribs 30, 31, 32. The mold part 25 is also formed with a socket 33 which receives a telescopic divider 34. The top mold part 26 has a rounded recess 38 at one end which results in the formation of the bead 13 and a rounded corner 39 at the other end which results in the formation of a rounded corner 17.

The first step of the present method may be described by noting that with the mold parts heated to a proper temperature and the connecting strip 18 properly positioned, the chip mix is loaded into the female mold section to a preselected depth. This depth will depend upon the thickness of the body required in the final operation. As the chip mix is loaded, it is initially compacted.

The connecting strip 18 is now covered by the masking strip 5 whereupon the backing sheets 9 and 8, the printed sheet 7, and alpha cellulose sheet 6 are placed over the chip mix in the order recited.

Figure 2:
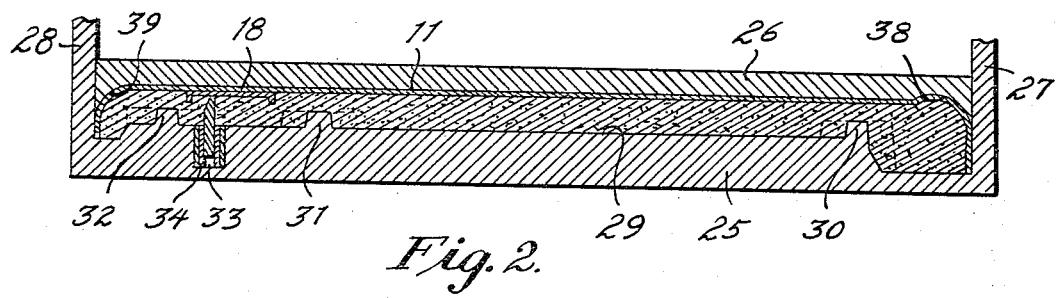
FIGURE 2 is a view similar to FIGURE 1 illustrating the condition of the press or mold after it has been operated to compress the loaded materials.

The mold is now introduced into the press and full heat is applied. The press is then closed and the ram moves slowly so as to move the male mold part 26 to its lowermost limit of position as determined by the dead stops (not illustrated). The pressing operation will ordinarily require about fifteen minutes. The condition of the mold at the conclusion of the molding operation is depicted in FIGURE 2. It will be noted that the chip mix now fully occupies a space about the ribs 31 and 32 and the divider 34 has been partly retracted into the socket 23 leaving just about that much above the surface 29 which corresponds to the thickness of the compressed mix. It is further noted that the laminae 9, 8, 7, and 6 have been compressed and partly cured to form the decorative overlay 11 which is bonded to the work piece body 10 and backsplash 16 but is not bonded to the connecting strip 18. A formed unit in the flat condition illustrated is now removed from the mold and suitably conveyed to a machine for removing the flash that is inevitably formed on the edges.

As this flash removal is not particularly pertinent to the improvements of the present invention neither it nor the apparatus for carrying it out is described. They are fully disclosed in the above identified copending application.

Immediately upon removal from the mold, the laminated plastic overlay is only partly cured. The curing will range from 70% to 90% with the optimum being 75%. In this condition, it is susceptible of bending and forming as will be later described. However, one of the advantages of the method of the copending application is that which permits of the units being stored flat, that is, before the bending of the connecting strip 18. If the units are stored flat then that portion of the overlay of the connecting strip 18 must be restored to a bendable condition. This is accomplished by heating. The heating may be carried out by passing an electrical current through the connecting strip 18 and/or by using infra-red heat over the required area.

Figure 4:
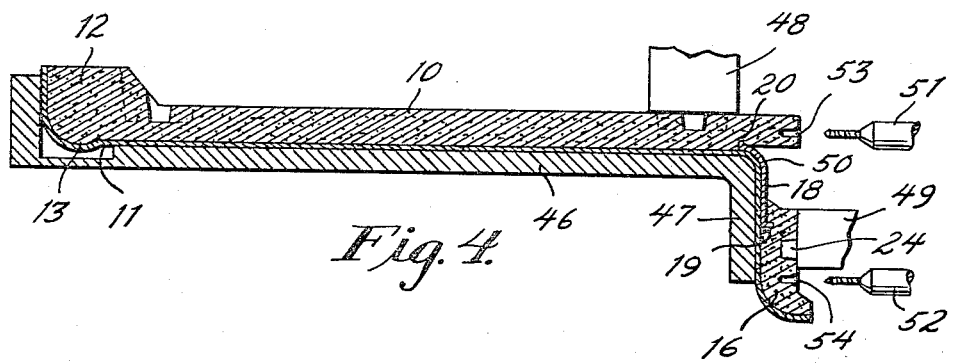
FIGURE 4 is a sectional view of a unit after it has been bent together with certain of the forming apparatus.

The unit with overlay covering the strip 18 in a bendable condition is now introduced to a bending machine such as shown in FIGURE 4. This bending machine comprises a bed 46 having a front depending flange 47 normal thereto, an anchoring flange 48 and a bending ram 49. The latter engages the back piece 16 and moves it into the position of FIGURE 4 during which operation the strip 18 is bent to provide the bend at 50. At the same time that portion of the overlay 11 which covers the strip 18 but which is free therefrom is also formed.

While in the bending machine, a multiple drill unit including drills 51 and 42 is operated to form the holes 53 and 54 in the body 10, and backsplash 16 respectively.

Figure 5:
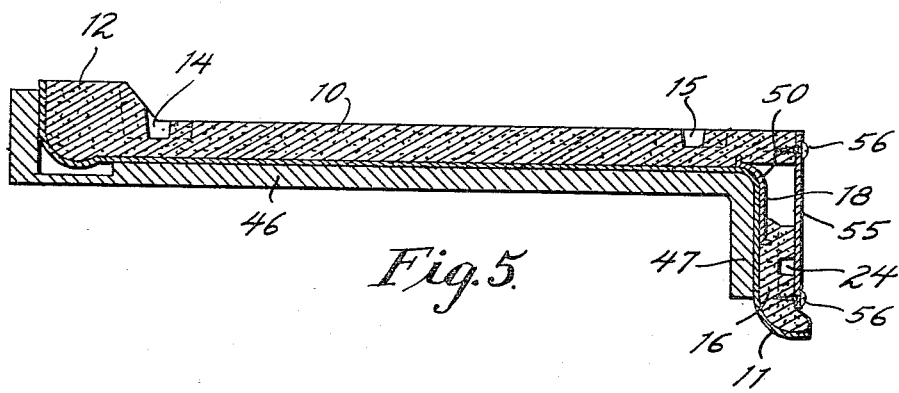
FIGURE 5 is a view similar to FIGURE 4 depicting the addition of a bracing strip.

As shown in FIGURE 5 a bracing strip 55 in the form of a steel strap is now applied and secured in position by screws 56 that pass through the strip 55 and into the holes 53 and 54.

While a preferred specific embodiment of the invention is hereinbefore set forth, it is to be clearly understood that the invention is not to be limited to the exact steps, materials, and proportions illustrated and described because various modifications of these details may be provided in putting this invention into practice within the purview of the appended claims.

What is claimed is:

1. In the molding of a countertop, the method including steps of placing a mixture of wood chips and resin into a mold having a body portion and a backsplash portion, inserting a deformable connecting strip between the body portion and backsplash portion, covering said connecting strip with means for preventing adhesion, placing a plastic overlay over the body portion, the backsplash portion and the connecting strip, applying pressure and heat to the assembled plastic overlay, body portion and backsplash portion thereby simultaneously molding a horizontal body and a backsplash on a common plane at the same time anchoring the connecting strip to said body and backsplash and at the same time molding the laminated plastic overlay that is bonded to said body and backsplash by the molding operation.

2. In the molding of a countertop, the method including the steps of placing a mixture of wood chips and resin into a mold having a body portion and a backsplash portion, inserting a deformable connecting strip between the body portion and backsplash portion, covering said connecting strip with means for preventing adhesion, placing a plastic overlay over the body portion, the backsplash portion and the connecting strip, applying pressure and heat to the assembled plastic overlay, body portion and backsplash portion thereby simultaneously molding a horizontal body and a backsplash on a common plane at the same time anchoring the connecting strip to said body and backsplash and at the same time molding the laminated plastic overlay that is bonded to said body and backsplash and partly cured by the molding operation and then bending said connecting strip and that portion of the overlay immediately thereover to form a rounded corner that provides a substantial right angular relation between said backsplash and body.

3. The method of claim 2 in which the connecting strip is masked from the overlay by a strip of kraft paper to permit the bending operation.

4. In the molding of a countertop, the method comprising the steps of placing a mixture of wood chips and resin into a mold having a body portion and a backsplash portion, inserting a deformable connecting strip between the body portion and backsplash portion, covering said connecting strip with means for preventing adhesion, placing a plastic overlay over the body portion, the backsplash portion and the connecting strip, applying pressure and heat to the assembled plastic overlay, body portion and backsplash portion thereby molding a horizontal body and backsplash joined by the connecting strip in a common plane and at the same time and while that portion of the overlay of the connecting strip is in a heated condition bending said connecting strip and that portion of the overlay thereover to form a rounded corner providing a substantially right angular relation between the backsplash and said body.

5. The method of claim 4 in which the heated condition of the overlay is derived from the residual heat of the molding operation.

6. The method of claim 4 in which the heated condition of the overlay is achieved by electrically heating said connecting strip.

7. The method of claim 4 in which the heated condition of the overlay is achieved by subjecting the portion of the overlay over the connecting strip to infrared heat.

References Cited
UNITED STATES PATENTS

| | | | |
|---|---|---|---|
| 2,471,203 | 5/1949 | Eddy | 156—289 X |
| 3,146,285 | 8/1964 | Munk | 246—266 |

FOREIGN PATENTS 913,034  12/1962  Great Britain.

ROBERT F. WHITE, *Primary Examiner.*

T. J. CARVIS, *Assistant Examiner.*